M. B. LLOYD.
TUBE WELDING MECHANISM.
APPLICATION FILED FEB. 4, 1914.
1,124,765.
Patented Jan. 12, 1915.
4 SHEETS—SHEET 2.
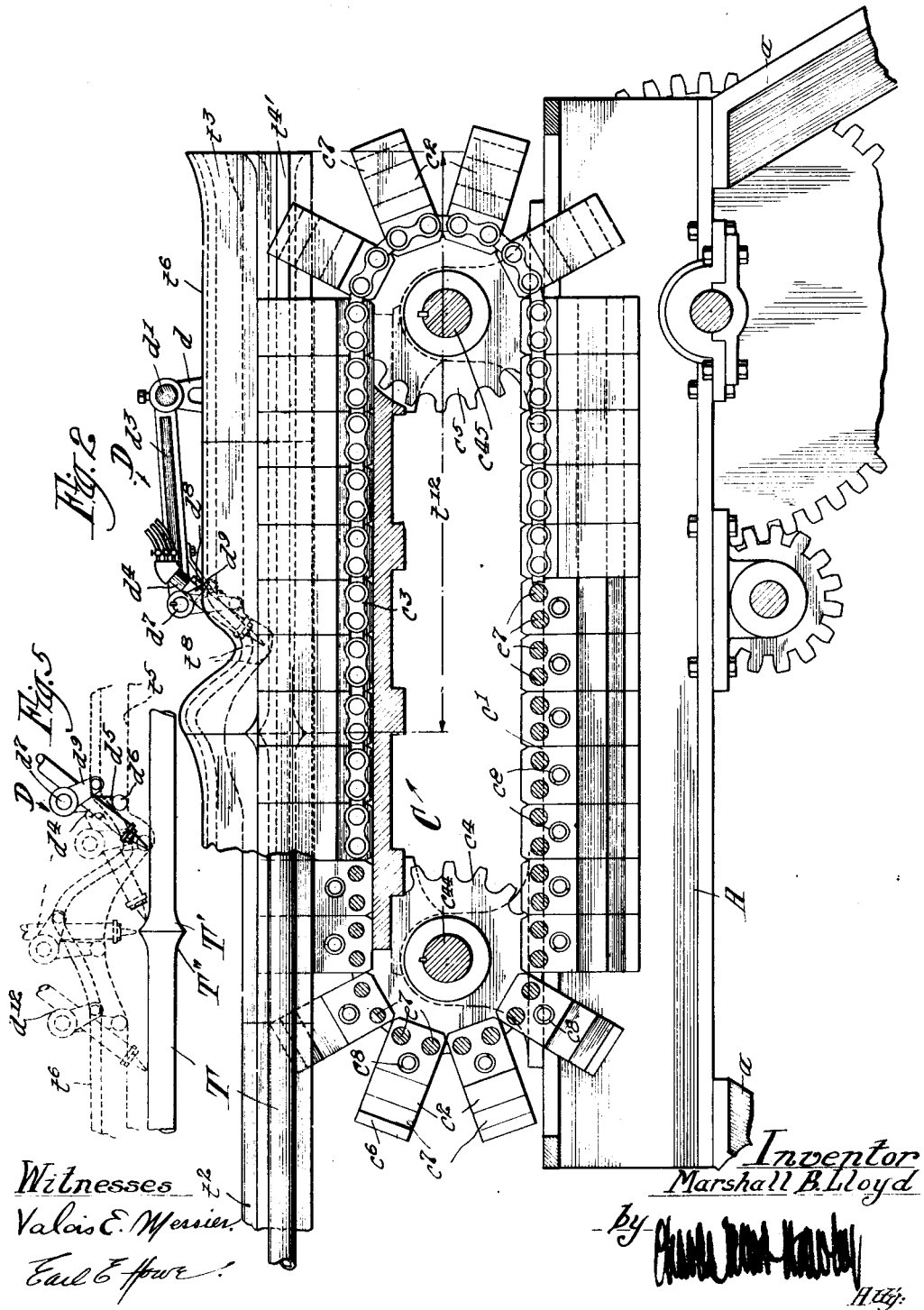
Witnesses
Valois E. Messier
Earl E. Howe
Inventor
Marshall B. Lloyd
by
Atty.

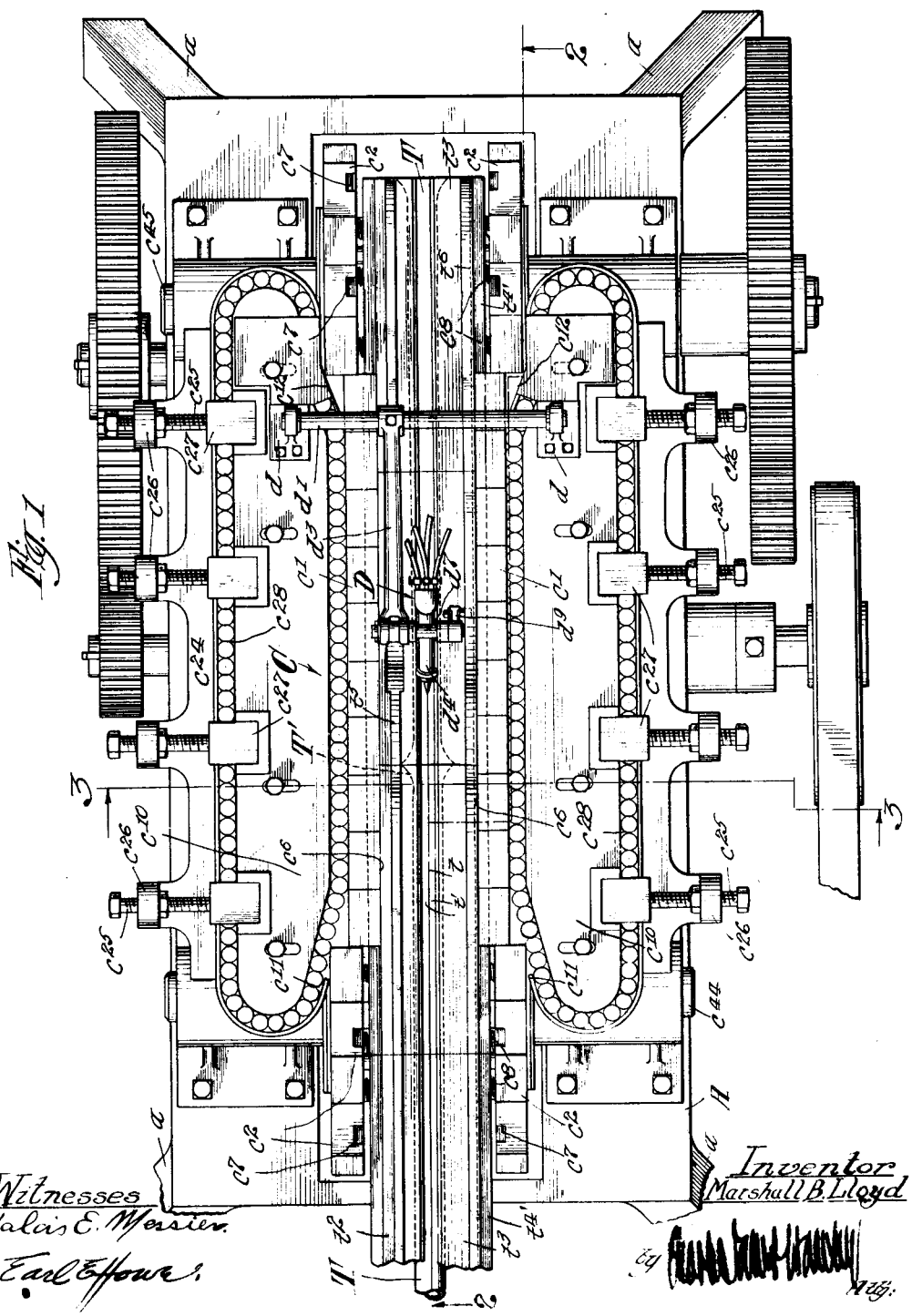

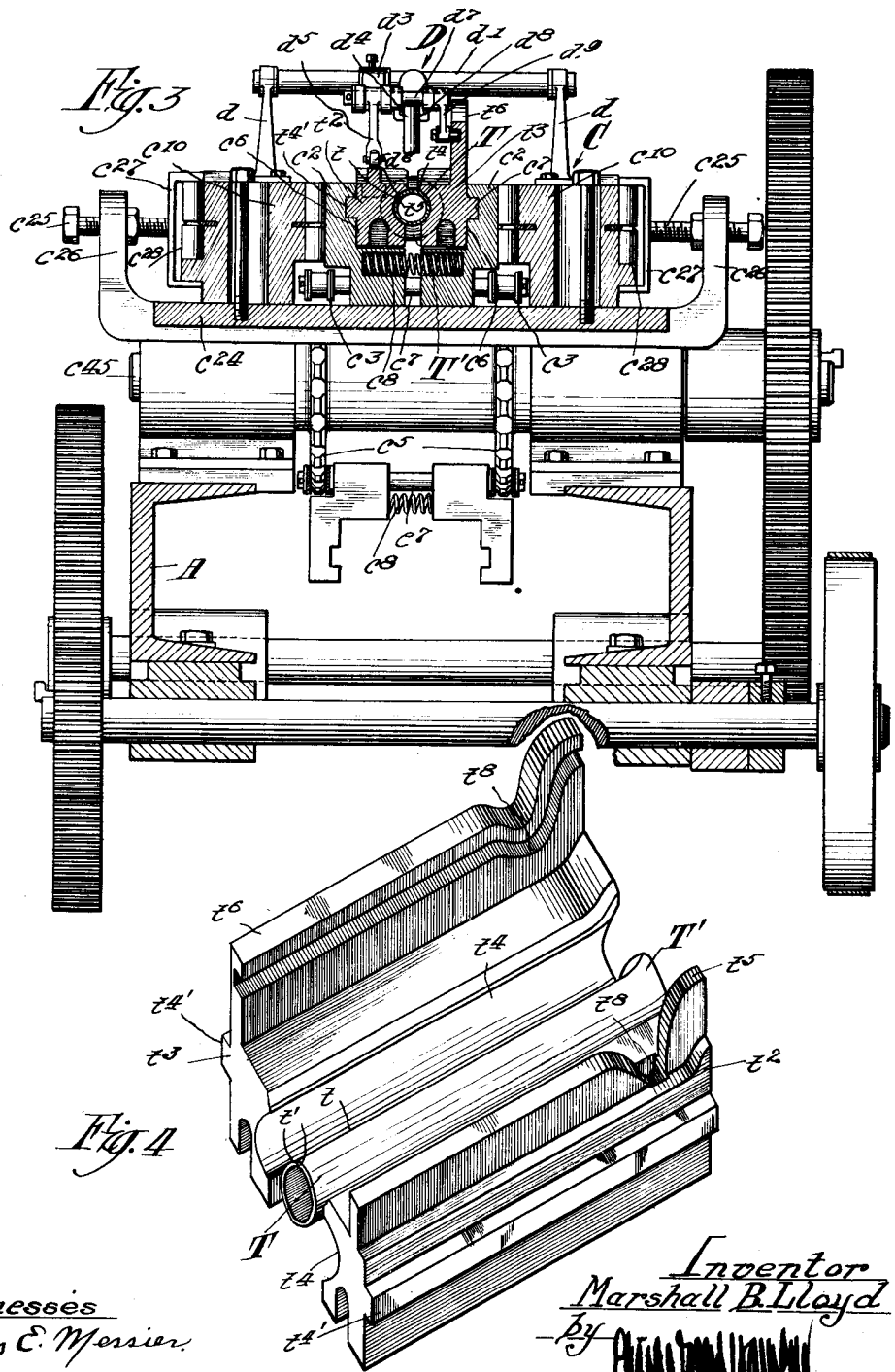

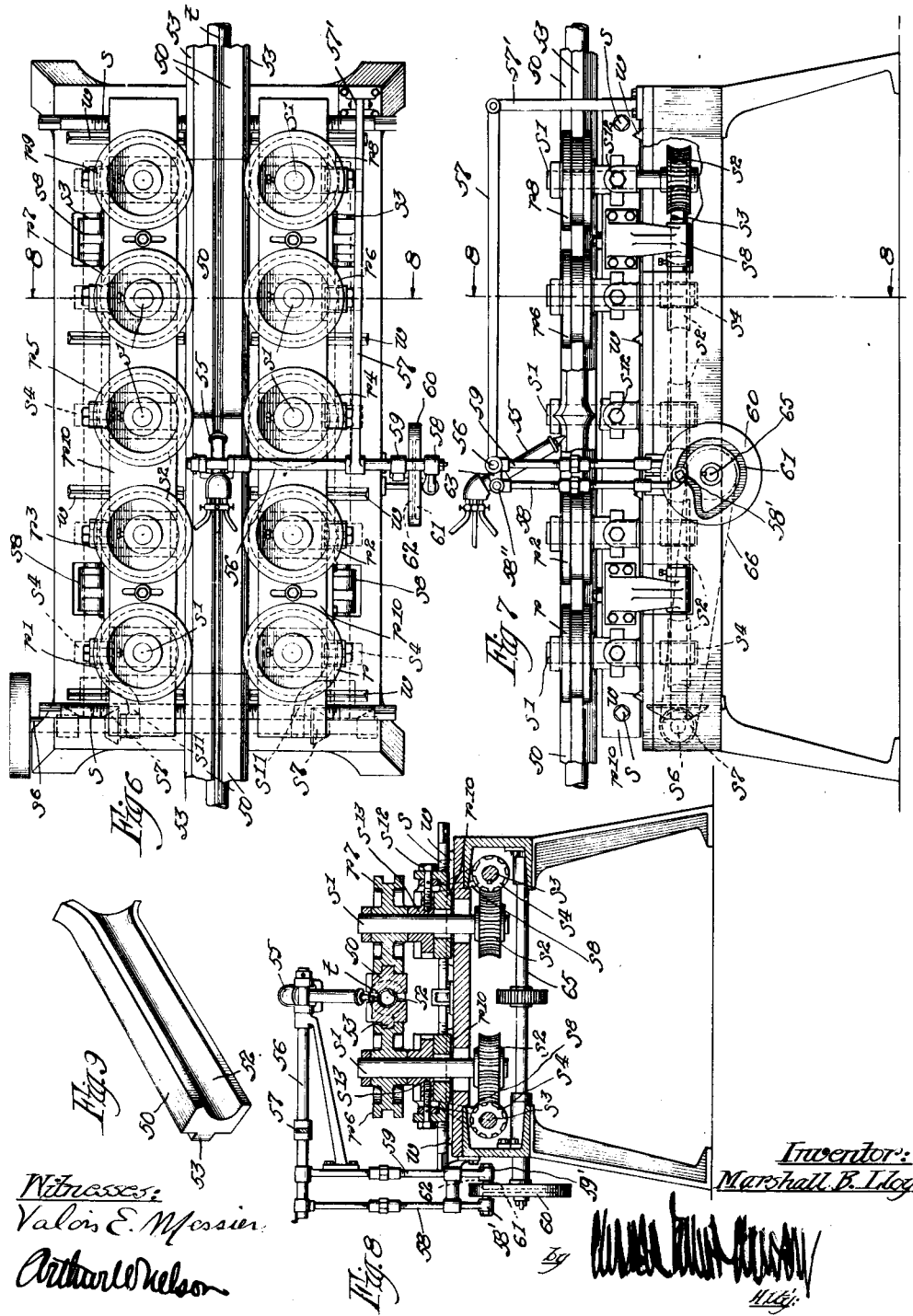

UNITED STATES PATENT OFFICE.

MARSHALL BURNS LLOYD, OF MENOMINEE, MICHIGAN, ASSIGNOR, BY MESNE ASSIGNMENTS, TO THE ELYRIA IRON & STEEL COMPANY, OF ELYRIA, OHIO, A CORPORATION OF OHIO.

TUBE-WELDING MECHANISM.

1,124,765. Specification of Letters Patent. Patented Jan. 12, 1915.

Application filed February 4, 1914. Serial No. 816,649.

*To all whom it may concern:*

Be it known that I, MARSHALL B. LLOYD, a citizen of the United States, and a resident of Menominee, county of Menominee, and State of Michigan, have invented certain new and useful Improvements in Tube-Welding Mechanism, of which the following is a specification.

My invention relates generally to welding mechanism and has particular reference to mechanism for welding articles by passing them under or by a source of heat and there, by the application of pressure, causing the fusing or welding thereof.

The general object of my invention is to provide mechanism with which it shall be possible to weld articles of various shapes, in which the seam is not parallel to the line of movement of the article when moved in a straight path, that is to say for welding articles having longitudinally disposed seams variant with respect to the general longitudinal extension of the article.

A further object of my invention is to provide simple mechanism with which it shall be possible rapidly and at low cost to weld tubes and similar articles having longitudinally extending irregular seams, and which shall be practically automatic in its operation.

My invention consists generally in a plurality of holders formed and adapted to embrace the articles to be welded and means adapted to grip the holders and articles therein and forward them under a source of welding heat.

My invention consists further in mechanism for welding various shaped articles comprising a plurality of article holders adapted in pairs to embrace one or more of the articles, a moving vise, and a welding torch positioned over the vise, the moving vise adapted to grip the holders and forward them, with the embraced article, under the welding torch, and cam surfaces co-operating with the torch-holding mechanism for maintaining the desired working relation between the torch and the article to be welded.

My invention consists further in the unique arrangement, construction, and combination of parts whereby those objects named above together with others which will appear hereinafter are attainable.

My invention will be more readily understood by reference to the accompanying drawings illustrating preferred embodiments thereof and in which:

Figure 1 is a plan view of mechanism embodying my invention; Fig. 2 is a vertical section thereof substantially on the line 2—2 of Fig. 1; Fig. 3 is a cross-sectional view substantially on the line 3—3 of Fig. 1; Fig. 4 is a perspective view showing an irregularly shaped article to be welded together with a pair of holders therefor; Fig. 5 is a diagrammatic view illustrating the operation of the torch guiding and position means; Fig. 6 is a plan view illustrating a modified form of my invention; Fig. 7 is a side elevation thereof, parts being broken away better to show the operation; Fig. 8 is a cross section substantially on the line 8—8 of Figs. 6 and 7; and Fig. 9 is a perspective view of a modified form of tube holder.

For the sake of convenience and brevity I shall consider only the welding of elongated hollow articles by the so-called oxy-acetylene process, but I wish it to be understood at the outset that my invention is not limited to such use. Hitherto no mechanism has been provided wherewith it is possible to weld various shaped hollow articles, in which the seam is presented at an angle to the line of movement when the article is moved in a straight path. The welding of hollow articles by this process has been hitherto limited almost exclusively to that of welding cylindrical articles, such as tubing and piping. The proper welding of hollow articles is a very delicate matter because a slight variation in the amount of heat applied; the manner of supplying the heat; a variation in the texture of the metal; in the speed at which the metal is passed under the welding flame; or in the amount of pressure applied, will oftentimes result in a defective weld. In welding cylindrical articles there is comparatively little difficulty in maintaining certain of these factors, but it will be readily seen that the welding of various shaped articles in which the seam would not be parallel to the straight line movement of the article, for example a wavy or irregular seamed tube, greatly increases the difficulty of properly maintaining these factors.

Referring now to the drawings: I shall describe in detail my unique mechanism which overcomes the difficulties named and which is well adapted to the economical production of variously formed and shaped tubes and articles.

A represents a strong bench or table supported at suitable and convenient height by legs $a$ and upon this table I mount the various mechanisms for acting upon the tube.

C represents a continuous vise or conveyer which is characterized by two endless gripping portions $c^1$, $c^1$. As will be explained more fully hereinafter, it is composed and divided into two pairs of opposed jaws $c^2$, which move successively in alinement with and grasp the article to be drawn through the agency of article-holding members.

T represents a typical form of hollow article, such as I contemplate welding, and, as will be seen in this instance, I have illustrated an article having a bell-shaped end T'. The article is usually made of sheet metal and when formed a longitudinal seam $t$ results, defined by the edges $t'$ which are in substantial abutment. It is this seam which I contemplate closing by the application of heat and such pressure as may be necessary. It will readily be seen that if the hollow article shown were simply presented to the vise each pair of vise jaws, in order that they be adapted properly to grasp the article, would have to be made in a particular manner and further assembled in the machine in a definite predetermined position. Several undesirable results would follow from such a construction, one of which would be that the length of the vise would have to correspond exactly to a given number of lengths of the article to be welded. It follows from this that if the length of the article were merely altered that the length of the vise would either have to be altered or else it would be incumbent upon the operator to allow one or more of the pairs of jaws to pass before presenting the next article. This would be impractical for the reason that the space between the articles would permit the torch to burn into or eat away a portion of the end of the article as it approached. This is one of the results which I desire particularly to avoid, since my main purpose is to provide a machine for manufacturing welded articles rapidly and economically, and the result of such construction would be that a portion of each of the articles would be destroyed or, at any rate, improperly welded. Another objection to making the vise jaws to grasp the article directly is that in many instances for each change in the shape or size of the article it would be necessary to apply a different set of gripping jaws. This would be extremely inconvenient, especially in shops where articles of various sizes and shapes are promiscuously welded. These defects I remedy in a simple and unique manner which will be best understood by reference to Fig. 4. The bell-shaped article T, which for convenience I shall term a "tube" is represented as the unit, which may be of any desired length and of any desired shape or form. For holding the tube, I provide two blocks or holders $t^2$ and $t^3$ which have similar inner recesses or concavities $t^4$ for complementary arrangement with the tube. As is best shown in Fig. 3, a pair of these blocks coöperate to embrace substantially all of the tube exposing, however, a portion adjacent the seam to permit the torch to play a flame upon the tube at that place. In this instance each of the blocks is provided with a cam surface, one thereof being indicated by the numeral $t^5$ and the other by the numeral $t^6$. For the particular article here being welded, I find that it is mechanically more convenient to make one of them an internal cam. The two blocks $t^2$ and $t^3$ are placed on the tube and the three parts are then started in the vise or moving holder. The further operation of these parts will be better understood by a more detailed description of the moving holder, the tube welding torch, and its supporting mechanism. The conveyer mechanism, as before briefly described, is characterized by two endless gripping portions $c^1$, $c^1$, divided into and composed of pairs of sections or jaws $c^2$, which move successively into alinement in the working stretch for clamping the tube, or in this instance the blocks $t^2$ and $t^3$ inclosing the tube. The jaws $c^2$ are arranged in pairs and are mounted upon two parallel endless chains $c^3$ running over corresponding sprockets $c^4$ and $c^5$ respectively. The jaws comprise small blocks of metal having opposed gripping faces $c^6$ in which I provide means for gripping the holders $t^2$ and $t^3$. In this instance I have provided each of the holders $t^2$ and $t^3$ with a longitudinal rib or projection $t^{4'}$ so that when the blocks are placed upon the tube and started into the moving vise they coact with the recesses $c^7$ in the vise gripping blocks, which conform to the cross sectional shape of these ribs. Hence as the blocks move successively into the working stretch they grip the ribs $t^{4'}$ and by means of the holders $t^2$ and $t^3$ exert their clamping pressure around substantially the whole circumference of the tubing. The jaws in this instance are laterally slidable or movable upon the connecting rods $e^7$ extending between corresponding points on the two chains or belts, and two of these rods are provided for each pair of jaw sections to insure their stability and prevent them from tilting. Between each pair of jaws I interpose a strong spring $c^8$ to keep the jaws normally open so that as they rise around the forward end of the vise they will properly pass into alinement with the ribs $t^{4'}$ of the tube clamping blocks, and as they move downwardly away from the tube and its holding blocks they will spread and release the blocks and tubing. The jaws are automatically closed upon the tubes, or rather upon the blocks holding the tube, by two cams or guide members $c^{10}$ which are parallel with the upper side or working stretch of the vise, and which form a groove or channel through which the jaws or sections travel in succession. The forward or receiving end $c^{11}$ of these pressure guides are flared or arranged as cams so that as the jaws rise or enter the forward end of the channel they are caused gradually to move toward each other and into clamping engagement with the two blocks, in which condition they are maintained until they reach the opposite ends of the channel. The opposite ends $c^{12}$ of the guide members are also flared away to allow the jaws quickly to open at that point. The guide members $c^{10}$ are slidably mounted on the bed plate $c^{24}$ of the machine and may be adjusted by means of the screws $c^{25}$ so that the clamping pressure of the vise may be regulated to any degree found to be suitable for the purpose and so that they may be readily adjusted to accommodate different sized tubes. The adjusting screws are mounted in upstanding lugs $c^{26}$ and they set against U-shaped members $c^{27}$ which bridge the roller races $c^{28}$ and have their ends set in sockets therefor in the guides.

The forward sprockets $C^4$ of the vise are mounted upon a shaft $C^{44}$ journaled in bearings fixed on the bench and the rear sprockets $C^5$ are mounted on the rear shaft $C^{45}$ journaled in similar bearings fixed on the bench. Any suitable power gearing, such as indicated in the drawings, may be employed for driving the power transmitted to such train of gearing. By this means continuous movement may be imparted to the chains or conveyers causing successive pairs of opposed jaws to rise into working position and there to be moved together by the guide bars.

For welding the tube I provide a mechanism D. It comprises a cross shaft or bridge member $d^1$ which is mounted in brackets $d^2$ upstanding from the machine. Upon the cross member I mount a long arm $d^3$ which carries an oxy-acetylene torch $d^4$ at its outer end. The long arm $d^3$ also carries at its outer end a depending member or leg $d^5$, which is provided with a roller $d^6$ which rides upon the cam surface $t^5$ of the tube-holding block $t^2$. The action of the arm $d^5$ is simply to raise and lower the long arm $d^3$ in direct accordance with the variations in the cam surface $t^5$. Also mounted in the outer end of the arm $d^3$, for rotation therein, is a stud shaft $d^7$ and it is this stud which carries the oxy-acetylene torch $d^4$ by means of a clip $d^8$.

I have found by experimentation and research that the torch welds best when it extends away from the tube at an acute angle. As before stated, if a weld of uniform nature and strength is desired, it is necessary to maintain definitely certain factors. The main factors to be maintained are the speed of the tube, the distance of the torch from the tube, and the angular position of the torch relative to the tube. The speed of the tube may be very nicely regulated by the power-gearing indicated in the drawing, and the distance of the torch from the tube is regulated by the arm $d^5$ riding upon the cam surfce, $t^5$, of the tube-holding block which is suitably formed. If the angle of the torch relative to the tube was immaterial, which in some instances it would be, the cam surface $t^5$ alone would be sufficient, and it would then follow directly the curve of the article to be welded. For instance, in the present case the cam surface $t^5$ would be substantially bell-shaped at the end so that as the bell-shaped portion of the tube approached the torch, the torch would simply be raised to maintain the same distance. But since in many instances the angular position of the torch is also of importance, I provide means for maintaining it as near as possible. For this purpose I provide another cam and in this instance I have formed it in the holder $t^3$. This cam serves to rock the torch by means of the arm $d^9$ which is secured to the stud shaft $d^7$ carrying the torch and which has a roller entering a cam groove. Now because of the double-cam control of the torch the cams assume a slightly different shape from the article being welded. For instance, in the welding of the bell-shaped tube I find that the combined action of the two cams requires that the cam surface shall be depressed as indicated at $t^8$ slightly before reaching the bell of the tube. Of course, it will be understood that these cams are simply designed to make the torch follow at the proper distance and maintain as near as practicable the same angular position. The action of the cams and torch is well illustrated in Fig. 5 which indicates diagrammatically the positions assumed by the torch as the bell-shaped portion is being welded. It will there be seen that as the torch approaches the bell end T' the torch is lowered, thereby maintaining substantially the same acute angle between the tube and the torch nozzle, and as the tube is forwarded the torch is automatically raised and at the same time swung at such an angle as to secure practically a right angle of the flame against the tube. As the receding portion $T''$ of the next tube passes, the cam then gradually acts to reposition the torch to the best angular position, as indicated at $d^{12}$. I have shown in the drawings one pair of holders clamping simply one length of tubing and in this instance two sets of holders, such as indicated, at $t^{12}$ in Fig. 2, comprise one cam cycle, i. e., it will be understood that the bell tubes are alternately reversed so that the adjoining portions of each of the tubes will be similar, i. e., bell-shaped at one end and cylindrical at the other. In this way the tubes abut end to end in such a manner as to make practically a continuous tube so that there is no danger of the torch flame eating into the tube such as would be the case if a small gap occurred between successive tubes. It should be obvious also that I may make the holders of a length sufficient to clamp two or more of the articles, and for some purposes such a construction would be preferable, for example, where the articles to be welded are comparatively short lengths. On the other hand, where the articles to be welded are quite long, it is more convenient to manufacture them so that one pair of holders simply clamps one length of tube.

The general operation of the device is as follows: The conveyers are given continuous movement by means of the gearing shown, and as the opposed pairs of jaws rise to the upper part of the conveyer, they are successively moved together by means of the pressure guides $C^{10}$. A pair of the tube-holders $t^2$ and $t^3$ are placed around the tube to be welded and the three parts are started into the moving conveyer and as the successive pairs of jaws are moved together they act to clamp the tube-holding blocks and exert compressive force upon the tube at the same time serving to forward the tube under the torch. The torch is always maintained at proper distance from the tube and positioned at the proper angle by means of the cam surfaces on the tube blocks. So soon as one set of tube clamps is substantially fully grasped by the conveyer, another set may be placed in end to end abutment therewith to follow through the conveyer and thus preserve the continuity of the welding operation.

In Figs. 6, 7, 8 and 9, I have shown a modified form of my invention which under some circumstances may be used to advantage. In this instance I provide a conveyer comprising a plurality of rolls $r$, $r^1$, $r^2$, $r^3$, $r^4$, $r^5$, $r^6$, $r^7$, $r^8$, and $r^9$. These are arranged in opposed pairs, the number and size of which may be varied to suit the conditions, and the rolls $r$, $r^2$, $r^4$, $r^6$, and $r^8$ are mounted upon a single base $r^{10}$. So also the rolls $r^1$, $r^3$, $r^5$, $r^7$, and $r^9$ are mounted upon a similar base $r^{10}$. The bases $r^{10}$ are slidable to and from each other, moving in suitable ways $w$ and may be easily moved by means of the right and left hand threaded bolts $s$. Each of the rolls is secured to the upper end of a vertical shaft $s^1$, the lower end of which is provided with a worm wheel $s^2$. Shafts $s^3$ are provised on each side of the machine and carry a number of worms $s^4$ which mesh with the worm wheels $s^2$ of the shafts $s^1$, and the shafts $s^3$ are driven by means of the power shaft $s^6$, and gearing $s^7$. In this manner all of the rolls are driven at the same peripheral speed. For holding the article to be welded I provide two blocks 50, which are identical in form and one of which is shown in Fig. 9. Assuming now that the same article is to be welded as was described in reference to Figs. 1 to 5, the block 50 contains a recess 52 of such shape as to accommodate substantially half of the bell tube. The block also contains a longitudinally disposed rib 53 for the same purpose as the rib $t^3$ (Fig. 4). When two blocks are placed upon the tube they embrace and inclose substantially all of it, leaving, however, the seam $t$ exposed. When thus placed upon the tube they are started into the first of the rolls $r$ and $r^1$ and are thereby forwarded to the succeeding rolls. The relative length of the holders and the number and position of the rolls is preferably such that after the blocks or holders are completely started into the machine, two or more pairs of rolls will constantly guide and forward the tube and its clamping blocks. The tube edges are welded by passing under a welding torch which is suitably positioned and adjusted to follow the shape of the article by mechanism which I shall now describe in detail. Located preferably at the center of the machine, and centrally above and between the opposed forwarding rolls, is the welding torch 55 which is mounted to move with a transverse rock shaft 56. The shaft 56 is supported by an arm 57, which is pivotally mounted in a bracket 57' upstanding from the machine bed and by means of two rods 58 and 59, the lower ends 58' and 59' of which co-act with a double cam wheel 60. It should be understood that with this form of my invention, the same as with the form described in reference to Figs. 1 to 7, it is desirable and necessary to maintain a definite constant distance between the seam of the article and the torch and also to maintain, as nearly as possible, the proper angular position between these parts. In this instance, instead of providing cam surfaces upon the tube holders I provide a separate cam 60 having cam grooves 61 and 62 which control the movement and position of the torch. The lower end 59' of the vertical rod 59 enters the groove 62 which is of such form that it will raise and lower the member 59 and therewith the transverse shaft 56 carrying the torch 55 at such times and to such extents as will constantly maintain substantially the same distance between the torch nozzle and the seam of the tube. The vertical rod 58 on the other hand has its lower end 58' in working engagement with the cam groove 61, so that at the proper times the vertical rod 58 is moved vertically. The upper end 58'' of the rod 58 is connected to an arm 63 affixed to the transverse shaft 56 so that the vertical movement of the rod 58 acts to rock the shaft 56 and torch therewith. By this means the proper annular position of the torch and tube is constantly maintained. Of course, it will be understood that the cam grooves 61 and 62 are designed in reference to the contour of the article to be welded and will therefore vary in form with the variation in form of the article being welded. Thus by means of the two cam grooves and the rods 58, 59 and the long arm 57, the torch is controlled and regulated both as to distance from the tube and to the angular position of the torch and tube. The cam 60 is mounted upon a transverse shaft 65 which is driven at the proper speed from the shaft $s^6$ by means of the chain drive 66.

When it is desired to take widely differing sizes of tubes the rolls on each side of the center may be moved by means of the screws $s$ which act upon and move the bases $r^{10}$. The driving connections are in no wise interrupted by this movement since the shafts $s^8$ are carried by bearings $s^8$ attached to the bases $r^{10}$. Likewise the driving connections $s^7$ are constantly maintained by means of the brackets $s^{11}$, which move the gears $s^7$ upon the shaft $s^6$ to which they are splined. The bases $r^{10}$ are usually moved only when tubes or blocks of considerably different size are to be handled and for securing more or less pressure upon the blocks I provide other adjusting means $s^{12}$ which set against the slidable blocks $s^{13}$ carrying the vertical shaft $s^1$ and the attached worm wheels. This movement is so slight that the working relation of the gears is not seriously effected.

It is evident that the machine as a whole has great flexibility, that is to say, that it can quickly and easily be made to accommodate various size tubes, to apply the necessary pressure as determined by the particular characteristics of the article being welded, and that it can be easily prepared to weld articles of practically any shape or configuration, that shown being only an example.

As many modifications will readily suggest themselves to those skilled in the art to which this appertains, I do not wish to limit myself to the exact structures herein shown and described, except as may be necessary by express limitations in the claims hereunto appended.

I claim:—

1. In a machine for welding articles having longitudinally disposed seams variant with respect to the general longitudinal extension of article, the combination of means for clamping such articles, means for conveying the clamped articles forward, a burner arranged to play a flame upon the article and weld the seam as it travels, and means for maintaining a substantially constant relation between the burner and the seam of the article to be welded.

2. In a machine for welding articles having longitudinally disposed seams variant with respect to the general longitudinal extension of article, the combination of means for clamping such articles, a heating element, means for causing relative movement of the clamped article and the heating element, and means for maintaining a substantially constant relation between the heating element and the seam of the article to be welded whereby the article is welded in the course of such movement.

3. In a machine for welding articles having longitudinally disposed seams which are variant to the line of movement when the article is moved in a straight path, the combination of a plurality of clamps formed and adapted to embrace such shaped articles, a heating device for raising the article to welding temperature, and means for imparting relative movement to the clamped article and the means for raising it to welding temperature, and means for maintaining a substantially constant relation between the heating device and the seam of the article.

4. In a machine for welding elongated articles having irregular seams, the combination of a plurality of clamps adapted in pairs to embrace the articles, a burner positioned to heat the seam, means for imparting relative movement to the clamps and embraced article, and the burner, and means for governing and maintaining substantially constant the position of the torch with respect to the seam of the article being welded.

5. In a machine for melding irregularly shaped articles, such as tubes and the like, the combination of a plurality of tube holders formed in pairs to embrace an irregularly shaped article, means for moving the article and clamps, a welding torch arranged adjacent the path thereof and positioned to impinge a flame upon the tube, means acting to maintain a definite distance between the tube seam and the torch tip, and means for controlling the angular position of the torch and seam.

6. In a machine for welding articles having longitudinally disposed seams variant with respect to the general longitudinal extension of article, comprising in combination a plurality of clamps adapted in pairs to embrace the article with the seam thereof exposed, means for gripping the holders and propelling them longitudinally forward, a welding torch arranged adjacent the path of the advancing article and positioned to impinge a welding flame upon the seam, together with cam mechanism operating to maintain a substantially constant distance between the torch and seam and to maintain a substantially constant angle of impingement of the torch flame upon the article.

7. In a machine for welding or similarly sealing irregularly shaped articles and tubes having a longitudinal seam, the combination of a pair of tube clamps adapted to embrace an irregularly shaped tube with the seam thereof exposed, a device for forwarding said clamps and embraced tube, coacting portions upon the tube clamps and forwarding means to enable the progressive gripping and positioning of the tube holders, a welding torch arranged adjacent the path of the article and positioned to play a welding flame upon the seam thereof, together with cam controlled means for maintaining a substantially constant welding position between the torch and the seam of the article.

8. In a machine for welding or similarly sealing articles and tubes having a longitudinal seam, angularly disposed to the line of movement when the article is moved in a straight path, the combination of a pair of tube clamps adapted to embrace such shaped article with the seam thereof exposed, a device for forwarding said clamps and embraced article, co-acting portions upon the tube clamps and forwarding means to enable the progressive gripping and positioning of the article holders, a welding torch arranged adjacent the path of the article and positioned to play a welding flame upon the seam thereof, together with cam-controlled means for maintaining a definite welding position of the torch with respect to the seam, and cam mechanism operable to swing the torch as necessary to maintain a substantially constant angle between the seam and the torch.

9. In a machine for welding or similarly sealing articles and tubes having a longitudinal seam variant with respect to the general longitudinal extension of the tube, the combination of means for clamping an irregularly shaped tube, an automatic traveling holder formed and adapted progressively to grasp and forward the clamping means and embraced tube, and a heating device arranged adjacent the path of the tube and positioned to play a welding flame upon the seam thereof and weld the same as the tube is so held and moved.

10. In a machine for welding articles having irregular longitudinal seams, the combination of means for clamping an article with the seam thereof exposed, an automatic traveling holder formed and adapted progressively to grasp and forward said article and clamping means, a welding torch arranged adjacent the path of the tube and positioned to play a welding flame upon and weld the article seam as it is so held and moved, together with means for maintaining a substantially constant distance between the torch nozzle and the seam.

11. In a machine for welding articles having longitudinally disposed seams variant with respect to the general longitudinal extension of the article, the combination of means for clamping such articles with the seam thereof exposed, an automatic traveling holder formed and adapted progressively to grasp and forward said article and clamping means, a welding torch arranged adjacent the path of the article and positioned to play a welding flame upon and weld the article seam as it is so held and moved, together with means for maintaining a substantially constant distance between the torch nozzle and the article seam, and means for maintaining a substantially constant angle between the welding torch and seam.

12. In mechanism of the class described, a plurality of clamping blocks adapted in pairs to embrace longitudinally seamed articles in which the seam is variant with respect to the general longitudinal extension of the article with the seam thereof exposed, an automatic traveling holder formed progressively to grasp and forward said clamps with the embraced article, in combination with a torch arranged adjacent the path of said article and positioned to play a welding flame upon and weld the seam thereof as the tube travels, means supporting the torch formed and adapted to permit movement of the torch to and from said clamping blocks together with cam actuated means for causing such movement.

13. In mechanism of the class described, a plurality of clamping blocks adapted in pairs to embrace a longitudinally seamed article, the seamed portion of which is irregular in profile with the seam thereof exposed, an automatic traveling holder formed progressively to grasp and forward said clamps with the embraced article, in combination with a torch arranged adjacent the path of said tube and positioned to play a welding flame upon the seam thereof as the tube travels, means supporting the torch formed and adapted to permit movement of the torch to and from said clamping blocks and to permit rotative movement with respect to the article, means for automatically moving the torch to and from said holder, and means automatically acting to impart rotative movement to the torch.

14. In a machine for welding articles having longitudinally disposed seams variant with respect to the general longitudinal extension of the article, the combination of a plurality of elongated clamping blocks formed and adapted in pairs to embrace such articles with the seam thereof exposed, an automatic moving holder for carrying the damped article forward and a torch for fusing said seam as it moves, a pivoted arm supporting said torch and arranged for movement to and from the article to be welded, a cam for controlling the movement of said arm together with means operatively connecting said arm and said cam.

15. In a machine for welding articles having longitudinally disposed seams variant with respect to the general longitudinal extension of the article, the combination of a plurality of elongated clamping blocks formed and adapted in pairs to embrace such articles with the seam thereof exposed, an automatic moving holder for carrying the clamped article forward and a torch for fusing said seam as the article moves, a pivoted arm arranged for movement to and from said tube, and supporting said torch rotatively at its outer end, together with cam actuated mechanism connected to swing said arm and to rock said torch upon its pivot.

16. In a machine for welding articles having longitudinally disposed seams variant with respect to the general longitudinal extension of the article, the combination of a plurality of tube clamping blocks adapted in pairs to embrace an article of such shape with the seam thereof exposed, means for moving said holders and embraced article forward, a torch arranged adjacent the path of the article and positioned to play a welding flame upon the seam thereof, and cam means upon said holders coacting with said torch to maintain a substantially constant distance between the nozzle thereof and the seam.

17. In a machine for welding articles having longitudinally disposed seams variant with respect to the general longitudinal extension of the article, the combination of a plurality of tube clamping blocks adapted in pairs to embrace such an article with the seam thereof exposed, means for moving said holders and embraced article forward, a torch arranged adjacent the path of the article and positioned to play a welding flame upon the seam thereof, and cam means upon said holders coacting with said torch to maintain a substantially constant distance between the nozzle thereof and the article and to maintain a substantially constant angle between it and the seam.

18. In a machine for welding articles having longitudinally disposed seams variant with respect to the general longitudinal extension of article, the combination of a plurality of elongated clamping blocks adapted to embrace such shaped articles with the seam thereof exposed, an automatic traveling holder formed successively to grasp and forward said clamping blocks and embraced article, in combination with a welding torch, means supporting the said torch for movement to and from the article, a cam surface upon said clamping blocks for moving the torch to and from the tube, together with means operatively connecting the torch supporting means and the cam.

19. In a machine for welding irregularly shaped articles and tubes having a longitudinal seam, the combination of a plurality of elongated clamping blocks adapted to embrace irregularly shaped articles with the seam thereof exposed, an automatic traveling vise formed progressively to grasp and forward said clamping blocks and embraced tube, a welding torch, means supporting said torch for rotative movement to and from the tube, a cam surface upon said clamping blocks for rocking the torch, together with means operatively connecting the torch supporting means and said cam.

20. In a machine for welding irregularly shaped articles and tubes having a longitudinal seam, the combination of a plurality of elongated clamping blocks adapted to embrace the irregularly shaped articles with the seam thereof exposed, an automatic traveling vise formed progressively to grasp and forward said clamping blocks and embraced tube, a welding torch, means supporting the torch for rotative movement and for movement as a whole to and from the tube, together with cam surfaces on said clamping blocks for moving the torch to and from the tube and for rocking it, and means extending between and connecting said cams and said torch supporting means.

In testimony whereof, I have hereunto set my hand this 20th day of January, 1914, in the presence of two subscribing witnesses.

MARSHALL BURNS LLOYD.

Witnesses:
 CHARLES GILBERT HAWLEY,
 ARTHUR W. NELSON.